United States Patent [19]

Okamoto et al.

[11] Patent Number: 4,546,125

[45] Date of Patent: Oct. 8, 1985

[54] ANAEROBIC CURING ADHESIVE COMPOSITIONS

[75] Inventors: Takanori Okamoto; Hisakazu Mori; Hideaki Matsuda, all of Kagawa, Japan

[73] Assignee: Okura Kogyo Kabushiki Kaisha, Japan

[21] Appl. No.: 608,519

[22] Filed: May 9, 1984

[30] Foreign Application Priority Data

May 12, 1983 [JP] Japan ................... 58-81706

[51] Int. Cl.$^4$ .............................................. C09J 3/00
[52] U.S. Cl. ..................... 523/176; 526/214; 526/204; 526/323.2; 526/320
[58] Field of Search ............... 523/176; 526/214, 204, 526/323.2, 320

[56] References Cited

U.S. PATENT DOCUMENTS

| | | | |
|---|---|---|---|
| 3,218,305 | 11/1965 | Krieble | 526/204 |
| 3,634,379 | 1/1972 | Hauser | 526/320 |
| 3,736,260 | 3/1973 | O'Sullivan et al. | 526/320 |
| 4,055,542 | 10/1977 | Saito | 526/204 |
| 4,069,378 | 1/1978 | DeMarco | 526/323.2 |
| 4,235,986 | 11/1980 | Catena | 526/323.2 |
| 4,262,106 | 4/1981 | Franenglass et al. | 526/323.2 |
| 4,374,940 | 2/1983 | Bhatia | 523/176 |
| 4,460,760 | 7/1984 | Okamoto et al. | 526/301 |
| 4,510,270 | 4/1985 | Okamoto et al. | 523/176 |

*Primary Examiner*—Paul R. Michl
*Assistant Examiner*—Alex H. Walker
*Attorney, Agent, or Firm*—Jacobs & Jacobs

[57] ABSTRACT

There is provided an anaerobic curing adhesives showing a quick curing property for not only active metals such as iron series metals etc., but also plated metals, comprising 100 parts by weight of anaerobically polymerizable monomers containing at least 10% by weight of a hydrophilic anaerobically polymerizable monomer capable of dissolving more than 0.5% by weight of water and following components (all parts are by weight) (a) to (d)

(a) o-benzoic sulfimide: 0.1 to 5 parts
(b) an aromatic tertiary amine: 0.1 to 5 parts
(c) a radical polymerization initiator: 0.05 to 3 parts
(d) water: 0.5 to 5 parts.

6 Claims, No Drawings

ANAEROBIC CURING ADHESIVE COMPOSITIONS

FIELD OF THE INVENTION

This invention relates to a one-part adhesive composition and more particularly to an anaerobic curing adhesive composition showing a quick curing property for various materials, in particular plated materials.

BACKGROUND OF THE INVENTION

Many anaerobic curing adhesives which are in liquid states when they are in contact with air but are cured when they are isolated from air in the case of existing in, for example, the gap between metals, etc., are known and utilizing the feature of these adhesives, they are widely used for fixing screws, sealing piping portions or flanged portions, fixing fitted portions, etc. Recently, there is a strong tendency of automating the assembling work of electric machinary parts, machine parts, etc., for the speed up of and labor-saving for the work and with such a tendency, a greatly quick curing property has been required for adhesives used in the work. Also, many plated materials are used as the parts in the foregoing assembling work for preventing the occurrence of corrosion and hence the development of one-part anaerobic curing adhesives showing quick curing property for plated materials has been desired.

However, conventional anaerobic curing adhesives are insufficient in adhesive speed for being used in automation line and this tendency is particularly remarkable for plated materials. Thus, in the case of using conventional anaerobic curing adhesives, complicated operations such as the use of a primer and the employment of heat curing are required.

As the result of various investigations for obtaining anaerobic curing adhesives showing a quick curing property for not only active metals such as iron series metals and copper series metals, etc., which are no subjected to surface treatment (hereinafter, are referred to as active metals) but also plated metals (hereinafter, is referred to as inactive metals), the inventors have discovered that a composition prepared by adding o-benzoic sulfimide, a heterocyclic tertiary amine and/or an aromatic tertiary amine, a radical polymerization initiator, and water to a hydrophilic anaerobic polymerizable monomer which can contain a small amount of water shows a very quick curing property for various metals including inactive metals.

Examples of using o-benzoic sulfimide and amines as a curing accelerator for anaerobic curing adhesives are disclosed in U.S. Pat. Nos. 3,043,820 and 3,218,305. In the latter patent it is described that a good adhesive speed for active metals is obtained in the case of using an amine selected from the group consisting of aromatic tertiary amines and heterocyclic secondary amines where in the heterocyclic ring is hydrogenated.

The inventors have discovered that when a definite amount of water is added to the foregoing composition containing the aromatic tertiary amine, the composition shows very fast curing property for not only active metals but also inactive metals. Furthermore, it has been discovered that a heterocyclic tertiary amine which does not provide so much quick curing effect for the conventional anaerobic composition provides remarkable quick curing property for the composition for not only active metals but also inactive metals if a definite amount of water exists in the system. It has further been discovered that among heterocyclic tertiary amines, quinolines and quinoxalines show more remarkable effects in the foregoing composition.

The present invention has been attained based on the foregoing discoveries.

SUMMARY OF THE INVENTION

That is, this invention provides an anaerobic curing adhesive composition comprising 100 parts by weight of anaerobically polymerizable monomers containing at least 10% by weight of a hydrophilic anaerobically polymerizable monomer capable of dissolving more than 0.5% by weight of water and following components (a) to (d)

(a) o-benzoic sulfimide: 0.1 to 5 parts by weight
(b) a heterocyclic tertiary amine and/or an aromatic tertiary amine: 0.1 to 5 parts by weight
(c) radical polymerization initiator: 0.05 to 3 parts by weight
(d) water: 0.5 to 5 parts by weight.

DESCRIPTION OF THE PREFERRED EMBODIMENT

One of the features of the composition of this invention is to use at least 10% by weight of a hydrophilic monomer as an anaerobically polymerizable monomer. That is, by using a hydrophilic monomer, a definite amount of water which is an indispensable component of this invention can be uniformly dissolved or dispersed in the adhesive composition, whereby the performance of the composition as anaerobic curing adhesives can be greatly improved. The particularly preferred hydrophilic monomers in this invention are the compounds shown by following general formula (1) or (2)

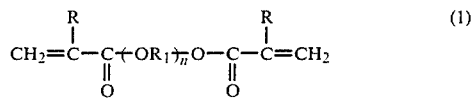

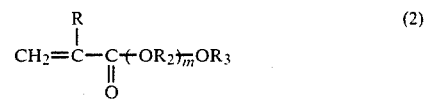

wherein R represents a hydrogen atom or a methyl group; $R_1$ and $R_2$ each represents an alkylene group having 2 to 4 carbon atoms or an halogenated alkylene group having 2 to 4 carbon atoms; $R_3$ represents hydrogen or an alkyl group having 1 to 2 carbon atoms; n is an integer of 3 to 14; and m is an integer of 1 to 14.

Examples of the hydrophilic monomer used in this invention are triethylene glycol diacrylate or methacrylate (hereinafter, is referred to as di(meth)acrylate), tetraethylene glycol di(meth)acrylate, hydroxyethyl (meth)acrylate, hydroxypropyl (meth)acrylate, hydroxybutyl (meth)acrylate, polyethylene glycol mono(meth)acrylate, polypropylene glycol mono(meth)acrylate, methoxytetraethylene glycol (meth)acrylate, methoxypolyethylene glycol (meth)acrylate, etc.

For the adhesive composition of this invention, less than 90% by weight of other anaerobically polymerizable monomer or monomers can be, if necessary, used together with the foregoing hydrophilic anaerobically polymerizable monomer. For such anaerobically polymerizable monomer, the compound (a) and/or compound (b) are particularly preferred;

(a) compound of the following general formula

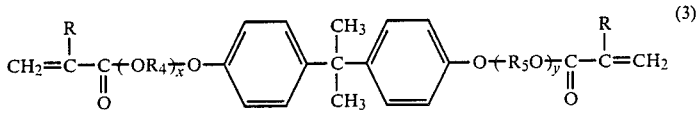

wherein $R_4$ and $R_5$ each represents an alkylene group having 2 to 4 carbon atoms and x and y are 1 or 2 and $4 > x + y > 2$; and (b) polyester (meth)acrylate.

The monomer of general formula (3) is a di(meth)acrylate of the addition product of Bisphenol A and an alkylene oxide. Since the adhesive speed of the adhesive composition tends to become low when $x + y \geqq 4$ in the monomer of general formula (3) and the adhesive composition tends to crystallize when $x + y = 2$, $x + y = 3$ or a mixture of $x + y = 2$, 3, 4 and $4 > x + y > 2$ on an average in the monomer of general formula (3) is most preferred.

Examples of the polyester (meth)acrylate are a compound obtained by the dehydration condensation reaction of a polyhydric alcohol, a polybasic acid anhydride, and (meth)acrylic acid and a compound obtained by the polyaddition reaction of a polyhydric alcohol, a polybasic acid anhydride, and glycidyl (meth)acrylate. It has also been discovered that when the heterocyclic tertiary amine which is one of the components of this invention is used as a catalyst in the case of producing the polyester (meth)acrylate by the aforesaid polyaddition reaction, the removal of an unnecessary catalyst from the polyester thus produced as the case of using conventional type catalyst, i. e., the application of a purification operation, etc., is unnecessary and also anaerobic curing adhesive composition containing the polyester (meth)acrylate thus obtained has a high faculty.

As described above, as the anaerobically polymerizable monomers used together with the hydrophilic anaerobically polymerizable monomer which is one of the primary components in this invention, the monomer (a) or (b) described above are particularly preferred in the points of adhesive speed and adhesive strength, but the following monomers may be also used. That is, they are poly(meth)acrylates of polyhydric alcohols such as ethylene glycol di(meth)acrylate, diethylene glycol di(meth)acrylate, propylene glycol di(meth)acrylate, trimethylolpropane tri(meth)acrylate, trimethylolethane tri(meth)acrylate, glycerol di(meth)acrylate, etc.; mono(meth)acrylates such as diphenyl(meth)acrolyloxyethyl phosphate, dibutyl(meth)acryloyloxyethyl phosphate, dicyclopentenyl (meth)acrylate, dicyclopentenyloxyethyl (meth)acrylate, etc.; terminal (meth)acrylated product of a liquid rubber; urethane poly(meth)acrylates; epoxy (meth)acrylates; tri(meth)acryloyloxyethyl isocyanurate; tri(meth)acryloylhexahydro-s-triazine, etc.

Also, a small amount of maleimides such as N-phenylmaleimide may be used for improving the heat resistance of the adhesive composition of this invention.

The heterocyclic tertiary amine and/or the aromatic tertiary amine and o-benzoic sulfimide are curing accelerators giving very quick curing property to the adhesive composition for inactive metals in the presence of water and the radical polymerization initiator.

Examples of the heterocyclic tertiary amine used in this invention are quinoline, 4-methylquinoline, 6-methylquinoline, quinaldine, quinoxaline, dimethylquinoxaline, phenazine, etc.

These heterocyclic tertiary amines scarcely show an action as a curing accelerator in the absence of water but become an excellent curing accelerator giving remarkable quick curing speed for inactive metals in the presence of a definite amount of water, that is, the synergistic effect with water is astonishing.

The aromatic tertiary amines act as a curing accelerator for active metals to some extent even in the absence of water but become an excellent curing accelerator providing very quick curing property for the composition in the presence of water even for bonding inactive metals which are difficult to bond by a conventional adhesive. Examples of the aromatic tertiary amine used in this invention are N,N-dimethyl-p-toluidine, N,N-dimethyl-m-toluidine, N,N-dimethyl-m-anisidine, N,N-dimethylaniline, etc.

The amount of these amines is 0.1 to 5 parts by weight, preferably 0.5 to 3 parts by weight to 100 parts by weight of the anaerobically polymerizable monomer. Even if the amines are added over the foregoing range, no more improvement of the property of the adhesive composition is not obtained and if the amount is less than the range, the adhesive speed becomes low. In addition, in this invention, other amine such as a heterocyclic secondary amine, etc., may be used partially together with the amine in this invention.

The amount of o-benzoic sulfimide is 0.1 to 5 parts by weight, preferably 0.5 to 3 parts by weight to 100 parts by weight of the monomer but when the sulfimide is used in an about equimolar amount to the amount of the foregoing amines, the curing acceleration action thereof becomes most remarkable. As the case may be, a salt obtained by reacting the foregoing amine or amines and an about equimolar amount of o-benzoic sulfimide in an inert solvent may be used and when such a salt is used, an adhesive composition having good property is also obtained.

Water can impart a remarkable quick curing property to the curing acceleration system composed of o-benzoic sulfimide and the foregoing amine or amines as described above and is a very important component in this invention. An example of an anaerobic curing adhesive composition containing water is described in U.S. Pat. No. 3,419,512. However, in the case of the patent, an alkali metal salt or calcium salt of an organic or inorganic acid and 0.25 to 0.5% water are added to the adhesive composition and the composition shows not only very slow adhesive speed for inactive metals but also far slow adhesive speed for active metals as compared to the adhesive composition of this invention, and it takes longer than few hours for initiating adhesion.

In the case of the adhesive composition of this invention, while a composition composed of, for example, the anaerobically curing monomer, hydroperoxide, o-benzoic sulfimide, and quinoline does not cause adhesion for inactive metals even after one hour at room temperature, when 2% by weight of water is added to the composition, the composition shows a quick curing property to an extent that it causes adhesion in a few minutes. The addition amount of water in this invention is 0.5 to 5 parts by weight, preferably 1 to 3 parts by weight. If the amount of water is over the aforesaid range, further improvement of the adhesive speed is not obtained and, on the contrary, the adhesive strength sometimes decreases, while the amount of water is less than 0.5 part by weight, quick curing property is not obtained. Such an amount of water in this invention is far larger than the amount of water usually containing in monomers or additives as impurities and than the amount described in foregoing U.S. Pat. No. 3,419,512. It is a very specific feature of this invention that such a large amount of water provides remarkable adhesion accelerating action for the specific composition of this invention without giving bad influence on the adhesive strength.

Examples of the radical polymerization initiator used in this invention are hydroperoxides, ketone peroxides, dialkyl peroxides, diacyl peroxides, and peroxy esters, but hydroperoxides such as t-butyl hydroperoxide, cumene hydroperoxide, diisopropylbenzene hydroperoxide, p-menthane hydroperoxide, etc., are particularly preferred. The addition amount of the radical polymerization initiator is 0.05 to 3 parts by weight, preferably 0.1 to 1 part by weight to 100 parts by weight of the anaerobically polymerizable monomer or monomers. In this invention, there is an advantage that the radical polymerization initiator gives a very quick curing property for the composition even in a small amount less than 0.5 part by weight, and therefore the amount of the polymerization initiator irritative to human body is acceptable in a small amount.

The adhesive composition of this invention is as described above but may further contain a stabilizer used ordinary for anaerobic curing adhesives, such as a quinone series polymerization inhibitor, a phenol series polymerization inhibitor, oxalic acid, ethylenediamine tetraacetic acid tetra-sodium salt, etc., for obtaining long preservative stability. Also, primary amines, amine salts of organic acids, acid phosphate, aminotri(methylenephosphoric acid), 1-hydroxyethylidene-1,1-diphosphoric acid, ethylenediamine tetra(methylenephosphoric acid), diallyldibutyl phosphonosuccinate, Crown ether, etc., are good preservative stabilizers by themselves or with the foregoing stabilizer. Furthermore, a small amount of a polymerizable sulfonic acid such as vinylsulfonic acid, styrenesulfonic acid, etc., or the salt thereof, anhydrous phosphoric acid, boric acid, a polymerizable acid phosphate, a silane coupling agent, a titanium coupling agent, etc., may be added to the adhesive composition of this invention for increasing the adhesive strength of the adhesive composition. Still further, if necessary, a proper amount of a coloring agent, a thickener, a thixotropy imparting agent, a plasticizer, etc., may be added to the adhesive composition of this invention.

As described above, the anaerobic curing adhesive composition of this invention shows strong adhesion for not only active metals but also inactive metals in a very short period of time and will largely contribute to the development of the industries of the art.

Then, the invention will further be explained in more detail by the following examples and comparison examples, in which all parts are by weight unless otherwise indicated. In addition, the property tests of each adhesive were performed by following methods (1) to (3) according to the Japanese Adhesive Industrial Standard JAI-6-1979.

(1) Measurement of adhesion initiating time:

An adhesive was coated on the thread of a bolt of M10, a nut was screwed onto the bolt and fixed without giving torque, and after allowing to stand the assembly at 23° C, the time until the nut could not be moved by hand by the initiation of adhesion was measured.

(2) Measurement of breakaway torque strength and prevailing torque strength:

After further allowing to stand the foregoing adhered nuts and bolts assembly for 24 hours at 23° C, the breakaway torque strength and prevailing torque strength thereof were measured by means of a torque wrench.

(3) Measurement of preservative stability (shelf life):

In a 100 milliliter polyethylene container was placed 50 ml. of an adhesive and while allowing to stand the vessel in a drying oven, the occurrence of the increase of the viscosity or gellation of the adhesive was observed. If no change occurs in an adhesive when the adhesive is allowed to stand for 10 days under the foregoing condition, the shelf life of the adhesion is said to be higher than one year at room temperature.

EXAMPLES 1 to 8 and COMPARISON EXAMPLE 1

To 100 parts of tetraethylene glycol dimethacrylate were added 0.92 part of o-benzoic sulfimide and definite amounts of a gelation stabilizer shown in Table 1, and after melting the mixture by heating, a definite amount of each of the various kinds of amines shown in Table 1 and then 0.3 part of cumene hydroperoxide and 2 parts of water were added to the mixture to provide each adhesive composition. The properties of the adhesive compositions were measured and the results are shown in Table 1. In addition, the nuts and bolts used for the adhesion tests were those zinc-plated and treated by a "Unichrome" process (hereinafter, are referred to as "Unichrome" treating).

As is clear from the results shown in Table 1, the adhesive compositions of this invention showed very quick curing property for the "Unichrome" treating metals to which the adhesion was difficult by conventional anaerobic curing adhesives. In addition, when the properties of the foregoing adhesive compositions containing no water were measured, it took longer than 60 minutes before the initiation of adhesion in each case.

Also, the adhesive property of the adhesive composition of Example 1 in Table 1 for nuts and bolts of M10 made of other various material than the foregoing "Unichrome" treating material was measured and the results thus obtained are shown in Table 2. For comparison, the adhesive property of the adhesive composition containing no water for the foregoing materials was measured and the results are also shown in Table 2. As is clear from the results shown in Table 2, it is understood that the effect of water for the adhesive composition are remarkable.

TABLE 1

| Example No. | Amine and addition amount (parts) | Gellation Stabilizer and addition amount (parts) | Shelf life (day) | Adhesion initiation time (minute) | Breakaway torque strength (kg-cm) | Prevailing torque strength (kg-cm) |
|---|---|---|---|---|---|---|
| 1 | quinoline (0.65) | none | >10 | 8 | 60 | 260 |
| 2 | 4-methylquinoline (0.72) | none | >10 | 12 | 40 | 200 |
| 3 | 6-methylquinoline (0.72) | oxalic acid (0.005) | >10 | 8 | 50 | 180 |
| 4 | quinaldine (0.72) | none | >10 | 20 | 40 | 195 |
| 5 | quinoxaline (0.65) | ethylenediamine salt of methacrylic acid (0.005) | >10 | 4 | 60 | 330 |
| 6 | 2,3-dimethylquinoxaline (0.79) | ethylenediamine salt of methacrylic acid (0.005) | >10 | 3 | 80 | 185 |
| 7 | N,N—dimethylaniline (0.61) | diallyldibutyl phosphonosucccinate (0.1) | >10 | 12 | 40 | 240 |
| 8 | N,N—dimethyl-p-toluidine (0.68) | diallyldibutyl phosphonosuccinate (0.1) | >10 | 7 | 40 | 285 |

TABLE 2

| | Adhesive of example 1 | | | Adhesive of comparison example 1 (same composition with example 1 except for containing no water) | | |
|---|---|---|---|---|---|---|
| Kind of nuts and bolts | Adhesion initiation time (minute) | Breakaway torque strength (kg-cm) | Prevailing torque strength (kg-cm) | Adhesion initiation time (minute) | Breakaway torque strength (kg-cm) | Prevailing torque strength (kg-cm) |
| Iron | 8 | 60 | 160 | >60 | 50 | 110 |
| Brass | 2 | 30 | 270 | 2 | 30 | 230 |
| Aluminum | 17 | 30 | 245 | 50 | 20 | 210 |
| Chromium plating | 10 | 45 | 210 | >60 | 30 | 113 |
| Zinc plating | 8 | 60 | 265 | 40 | 40 | 225 |
| Nickel plating | 10 | 65 | 230 | >60 | 3 | 0 |
| "Unichrome" treating | 8 | 60 | 260 | >60 | 30 | 170 |

EXAMPLES 9 to 18

To 100 parts of the anaerobically polymerizable monomer shown in Table 3 were added 0.92 part of o-benzoic sulfimide and the gelation stabilizer shown in Table 3 together with other additives and after melting the mixture by heating 0.65 part of quinoxaline, 0.3 part of cumene hydroperoxide and 2 parts of water were added to the mixture to provide each adhesive composition. Then, the properties of the adhesive compositions thus prepared were measured using the "Unichrome" treating nut and bolt as in the aforesaid examples and the results thus obtained are shown in Table 3.

The results indicate that the adhesive compositions of this invention show very good adhesive speed. In addition, for comparison, the properties of anaerobic curing adhesive compositions prepared using the anaerobically polymerizable monomer shown in Table 3 excluding the hydrophilic monomer but in this case, water could not uniformly dissolved or dispersed in the aerobically polymerizable monomer and the adhesion initiating time was longer than 60 minutes in each case.

TABLE 3

| Example No. | Anaerobically polymerizable monomers and amount (part) | Gellation stabilizer and other additive, and amount (part) | Shelf life (day) | Adhesion initiation time (minute) | Breakaway torque strength (kg-cm) | Prevailing torque strength (kg/cm) |
|---|---|---|---|---|---|---|
| 9 | polyethylene glycol dimethacrylate (100) | dibenzo-18-crown-6 (0.05) | >10 | 4 | 40 | 130 |
| 10 | urethane polymethacrylate *1 (90) hydroxypropyl methacrylate (10) | ethylenediamine salt of methacrylate acid (0.01) | >10 | 11 | 170 | 270 |
| 11 | hydroxypropyl methacrylate (100) | oxalic acid (0.005) | >10 | 12 | 290 | 280 |
| 12 | polyester methacrylate *2 (50) tetraethylene glycol dimethacrylate (50) | ethylenediamine tetra(methylenephosphoric acid) (0.005) | >10 | 6 | 120 | 270 |
| 13 | trimethylolpropane trimethacrylate (60) | aminotri(methylenephosphoric acid) (0.005) | >10 | 5 | 40 | 40 |

TABLE 3-continued

| Example No. | Anaerobically polymerizable monomers and amount (part) | Gellation stabilizer and other additive, and amount (part) | Shelf life (day) | Adhesion initiation time (minute) | Breakaway torque strength (kg-cm) | Prevailing torque strength (kg/cm) |
|---|---|---|---|---|---|---|
| | methoxypolyethylene glycol methacrylate (40) | | | | | |
| 14 | epoxy methacrylate *3 (50) tetraethylene glycol dimethacrylate (50) | oxalic acid (0.005) | >10 | 10 | 95 | 315 |
| 15 | terminal-methacrylated liquid rubber *4 (30) tetraethylene glycol dimethacrylate (30) ethoxyethyl methacrylate (40) | oxalic acid (0.005) | >10 | 6 | 50 | 40 |
| 16 | dimethacrylate of adduct of Bisphenol A and 3 moles of ethylene oxide (90) hydroxypropyl methacrylate (10) | ethylenediamine salt of methacrylic acid (0.005) | >10 | 7 | 50 | 240 |
| 17 | dimethacrylate of adduct of Bisphenol A and 3 moles of ethylene oxide (50) hydroxypropyl methacrylate (50) | oxalic acid (0.005) | >10 | 4 | 130 | 190 |
| 18 | dimethacrylate of adduct of Bisphenol A and 3 moles of ethylene oxide (50) hydroxypropyl methacrylate (50) | oxalic acid (0.005) anhydrous phosphoric acid (0.05) | >10 | 5 | 420 | 440 |

In Table 3:
*1 Addition reaction product of hexamethylene diisocyanate and hydroxypropyl methacrylate in 1:2 by mole ratio.
*2 Product obtained by the addition reaction of diethylene glycol, phthalic anhydride, and glycidyl methacrylate in 1:2:2 by mole ratio using quinoline as a catalyst.
*3 Addition reaction product of Bisphenol A diglycidyl ether and methacrylic acid in 1:2 by mole ratio.
*4 Methacrylic acid addition product of terminal-epoxylated liquid polybutadiene.

EXAMPLES 19 to 23 and COMPARISON EXAMPLES 2 to 4

To a mixture of 50 parts of the dimethacrylate of an addition product of Bisphenol A and 3 moles of ethylene oxide and 50 parts of hydroxypropyl methacrylate were added 0.005 part of ethylenediamine tetra(methylenephosphoric acid) and 0.92 part of o-benzoic sulfimide and after melting the mixture by heating and then cooling the mixture to room temperature, 0.65 part of quinoxaline, 0.3 part of cumene hydroperoxide, and 0 to 6 parts of water to provide each adhesive composition. The properties of the adhesive compositions for a "Unichrome" treating nut and bolt are measured as in the foregoing examples and the results thus obtained are shown in Table 4.

From the results shown in Table 4, it is clear that the addition of a definite amount of water greatly increases the adhesion speed.

TABLE 4

| No. | Amount of water (part) | Adhesion initiation time (min.) | Breakaway torque strength (kg-cm) | Prevailing torque strength (kg-cm) | Shelf life (day) |
|---|---|---|---|---|---|
| 2* | 0 | >60 | 25 | 45 | >10 |
| 3* | 0.2 | >60 | 40 | 35 | >10 |
| 19** | 0.5 | 20 | 150 | 205 | >10 |
| 20** | 1.0 | 15 | 160 | 240 | >10 |
| 21** | 2.0 | 5 | 225 | 235 | >10 |
| 22** | 3.0 | 3 | 175 | 200 | >10 |
| 23** | 5.0 | 2 | 130 | 220 | >10 |
| 4* | 6.0 | 2 | 50 | 115 | >10 |

*Comparison example
**Example of this invention

COMPARISON EXAMPLES 5 to 8

About the adhesive compositions shown in Example 17, from which one component shown in Table 5 was removed, the adhesive property for the "Unichrome" treating nut and bolt was measured as in the foregoing examples and the results thus obtained are shown in Table 5.

As is clear from the results shown in Table 5, if even one component is lacking in the adhesive component of this invention, the adhesion speed is greatly reduced as well as the adhesive strength is considerably reduced.

TABLE 5

| No. | Removed component | Adhesion initiation time (minute) | Breakaway torque strength (kg-cm) | Prevailing torque strength (kg-cm) |
|---|---|---|---|---|
| 5* | water | >30 | 140 | 150 |
| 6* | cumene hydroproxide | >30 | 0 | 0 |
| 7* | quinoxaline | >30 | 90 | 160 |
| 8* | o-benzoic sulfimide | >30 | 140 | 255 |

TABLE 5-continued

| No. | Removed component | Adhesion initiation time (minute) | Breakaway torque strength (kg-cm) | Prevailing torque strength (kg-cm) |
|-----|-------------------|-----------------------------------|------------------------------------|-------------------------------------|
| 17** | — | 5 | 225 | 325 |

*: Comparison example
**: Example of this invention

What is claimed is:

1. An anaerobic curing adhesive composition comprising 100 parts by weight of anaerobically polymerizable monomers containing at least 10% by weight of a hydrophilic anaerobically polymerizable monomer capable of dissolving more than 0.5% by weight of water and following components (a) to (d)
   (a) o-benzoic sulfimide: 0.1 to 5 parts by weight
   (b) a quinoline, a quinoxaline, phenazine or an aromatic tertiary amine: 0.1 to 5 parts by weight
   (c) a radical polymerization initiator: 0.05 to 3 parts by weight
   (d) water: 0.05 to 5 parts by weight 2. The anaerobic curing adhesive according to claim 1, wherein said component (b) is quinoline, 4-methyl-quinoline, 6-methyl-quinoline, quinaldine, quinoxaline, dimethylquinoxaline or phenazine.

3. The anaerobic curing adhesive composition as claimed in claim 1, wherein the hydrophilic anaerobically polymerizable monomer capable of dissolving more than 0.5% by weight of water is a compound represented by general formula (1) or (2)

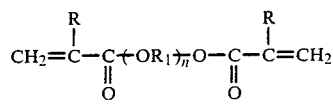

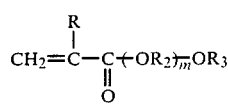

wherein R represents hydrogen or methyl; $R_1$ and $R_2$ each represents alkylene having 2 to 4 carbon atoms or halogenated alkylene having 2 to 4 carbon atoms; $R_3$ represents hydrogen or alkyl having 1 or 2 carbon atoms; n represents an integer of 3 to 14 and m represents an integer of 1 to 14.

4. The anaerobic curing adhesive composition as claimed in claim 1, wherein the other anaerobically polymerizable monomer than the hydrophilic anaerobically polymerizable monomer is (a) and/or (b)
   (a) the compound represented by the following general formula (3)

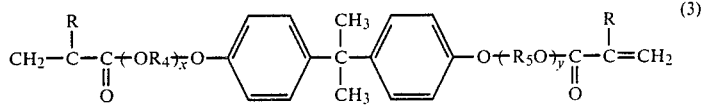

wherein $R_4$ and $R_5$ each represents alkylene having 2 to 4 carbon atoms and x and y are 1 or 2 and $4 > x + y > 2$,
   (b) polyester acrylate or polyester methacrylate.

5. The anaerobic curing adhesive composition as claimed in claim 1, wherein the radical polymerization initiator is hydro peroxide.

6. The anaerobic curing adhesive composition as claimed in claim 1, wherein the adhesive composition further contains a quinone series polymerization inhibitor, a phenol series polymerization inhibitor, oxalic acid, an acid phosphate, aminotri(methylenephosphoric acid), ethylenediamine tetra(methylenephosphoric acid), diallyldibutyl phosphonosuccinate, an amine salt of an organic acid, or Crown ether as a gellation stabilizer.

* * * * *